(12) United States Patent
Scorza et al.

(10) Patent No.: US 8,452,000 B2
(45) Date of Patent: May 28, 2013

(54) SYSTEM AND METHODS FOR MANAGING TANDEM SWITCH INFORMATION

(75) Inventors: Brett Scorza, Plainfield, IL (US); Jeff Carney, Naperville, IL (US); Ronald Gavillet, Glencoe, IL (US)

(73) Assignee: Neutral Tandem, Inc., Chicago, IL (US)

( * ) Notice: Subject to any disclaimer, the term of this patent is extended or adjusted under 35 U.S.C. 154(b) by 1415 days.

(21) Appl. No.: 11/866,800

(22) Filed: Oct. 3, 2007

(65) Prior Publication Data

US 2008/0080684 A1 Apr. 3, 2008

Related U.S. Application Data

(60) Provisional application No. 60/827,907, filed on Oct. 3, 2006.

(51) Int. Cl.
*H04M 7/00* (2006.01)

(52) U.S. Cl.
USPC .................. 379/224; 379/221.14; 379/112.01

(58) Field of Classification Search
USPC .................. 379/112.01, 112.05–8, 114.01–3, 379/114.06, 114.08, 114.22–24, 115.01, 379/133, 137, 138, 224, 221.14
See application file for complete search history.

(56) References Cited

U.S. PATENT DOCUMENTS

| | | | | |
|---|---|---|---|---|
| 5,703,938 | A * | 12/1997 | Lucas et al. | 379/112.05 |
| 6,721,405 | B1 * | 4/2004 | Nolting et al. | 379/133 |
| 7,830,859 | B1 * | 11/2010 | Rangarajan et al. | 370/351 |
| 2003/0223564 | A1 * | 12/2003 | Baker et al. | 379/218.01 |

* cited by examiner

*Primary Examiner* — Antim Shah
(74) *Attorney, Agent, or Firm* — William J. Lenz; Neal, Gerber & Eisenberg LLP

(57) ABSTRACT

A system and associated methods for automation and management of trunk routing among switches in a telecommunications network between carriers connected to a third party tandem services provider or manager (a "neutral tandem network.") The system and methodology can be used to, among other things, effectuate a business model for providing preferred rates, or other preferences, to a defined group of members or subscribers by managing and directing subscriber-associated call traffic from subscriber-owned switches to one or more tandem switches owned by a third-party tandem managing entity other than a LEC or ILEC.

6 Claims, 19 Drawing Sheets

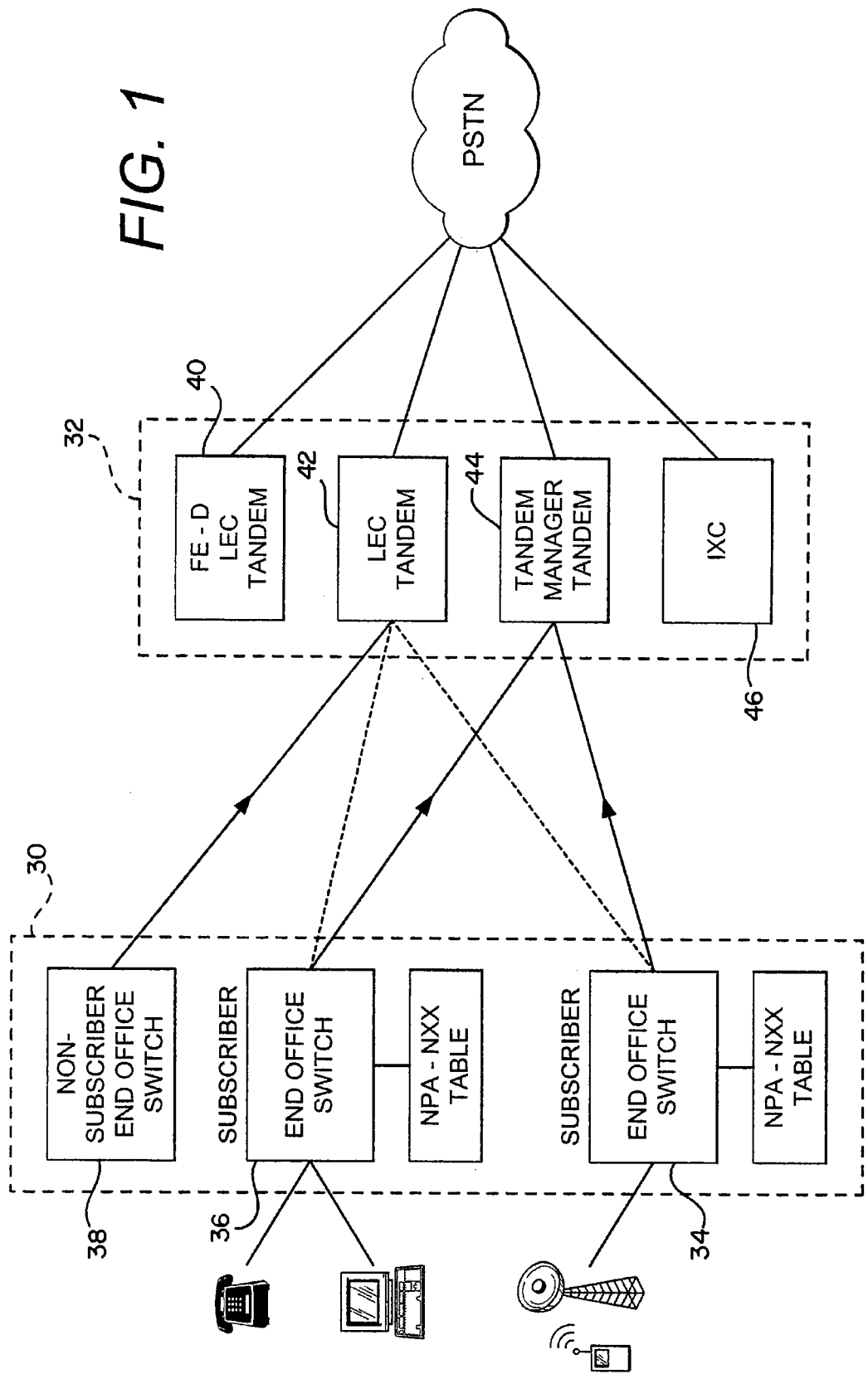

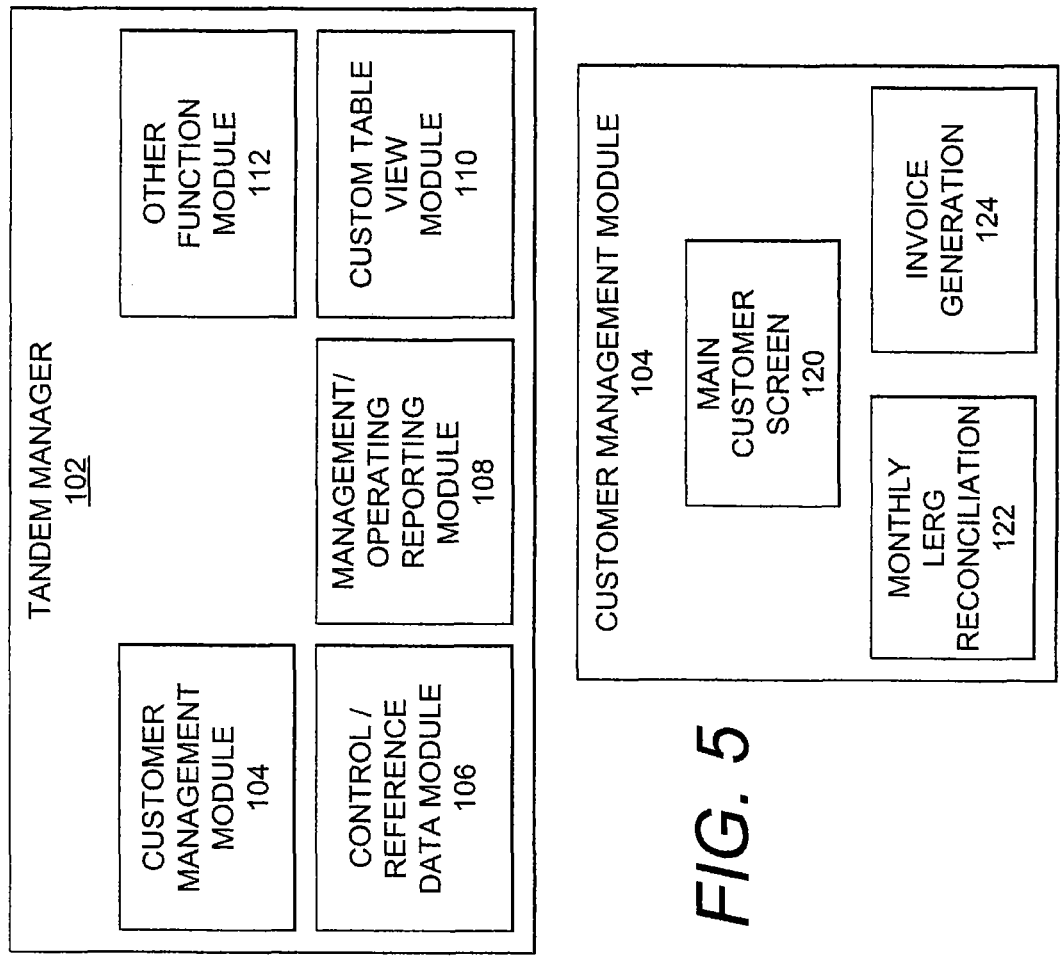
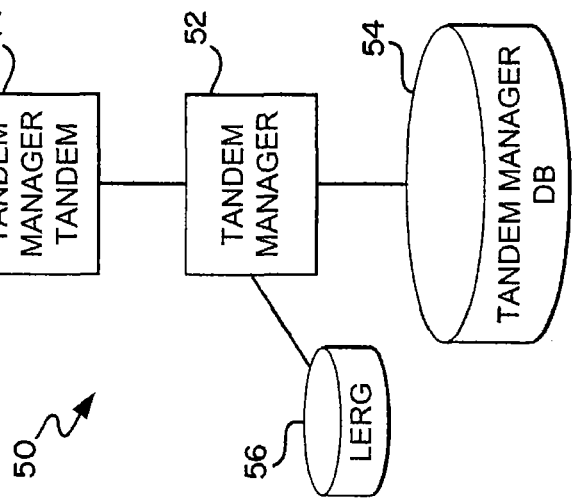

FIG. 4

TANDEM MANAGER – MAIN MENU

TANDEM MANAGER

MANAGE CUSTOMERS, ROUTING, INVOICES
- ☑ MAIN CUSTOMER SCREENS
- ☐ MONTHLY LERG RECONCILIATION
- ☐ INVOICE GENERATION

OTHER FUNCTIONS
- ☐ CHANGE PASSWORD / SWITCH USERS
- ☐ MANAGE E-MAIL TEMPLATES

MANAGE CONTROL / REFERENCE DATA
- ☐ CUSTOMER / ACCOUNT DATA
- ☐ MARKETS & NEUTRAL TANDEM SWITCHES
- ☐ ROUTING & LERG DATA
- ☐ SYSTEM CONFIGURATION

MANAGEMENT / OPERATIONAL REPORTING

*CUSTOMER / ACCOUNT*
- ☐ CUSTOMER SUMMARY 1
- ☐ CUSTOMER SUMMARY 2

*BILLING / INVOICING*
- ☐ INVOICE CONTROL
- ☐ UNBILLED USAGE

*ROUTING*
- ☐ TRAFFIC ANALYSIS REPORTS
- ☐ FIND MINUTES REPORT
- ☐ UNVERIFIED ROUTING

*MANAGEMENT REPORTING*
- ☐ NT DASHBOARD

*TRAFFIC REPORTING*
- ☐ TRANSLATION AUDIT
- ☐ OFF-NET TRAFFIC

CUSTOM TABLE VIEWS

*NT TABLES*
- ☐ NT CODES
- ☐ NT ROUTING
- ☐ NT LERG

*LERG TABLES*
- ☐ LERG 1
- ☐ LERG 6
- ☐ LERG 7
- ☐ LERG7SHA

USER ADMIN

MANAGE CODES [ CLEC #05 / CHCGIL24DSO ]

SWITCH: CHCGIL24DSO
METASOLV ORDER#:

SWITCH INFO
CLLI:
CUSTOMER:
ORIG MARKET:

ORDER INFORMATION
ORDER DATE:
ORDER REP:
ORDER CUST:
ORDER MKT:

✓ VALIDATE ORDER

**\*\*ON-NET SWITCH\*\***

INTRA-LATA | INTRA-LATA (RTS) | SPECIAL (TN) ROUTING | INTER-MARKET ROUTING | NOTEPAD

AVAILABLE

152 >
154 <

| CODES OWNED INFO | ROUTING SWITCH INFO |
|---|---|
| CHCGILABDSO: 219-488 | CHCGIL24DSO |
| CHCGILABDSO: 219-695 | CHCGIL24DSO |
| CHCGILABDSO: 219-697 | CHCGIL24DSO |
| CHCGILABDSO: 219-714 | CHCGIL24DSO |
| CHCGILABDSO: 219-979 | CHCGIL24DSO |
| CHCGILABDSO: 224-286 | CHCGIL24DSO |
| CHCGILABDSO: 224-366 | CHCGIL24DSO |
| CHCGILABDSO: 224-699 | CHCGIL24DSO |
| CHCGILABDSO: 224-778 | CHCGIL24DSO |
| CHCGILABDSO: 224-993 | CHCGIL24DSO |
| CHCGILABDSO: 312-261 | CHCGIL24DSO |
| CHCGILABDSO: 312-264 | CHCGIL24DSO |
| CHCGILABDSO: 312-373 | CHCGIL24DSO |
| CHCGILABDSO: 312-503 | CHCGIL24DSO |
| CHCGILABDSO: 312-602 | CHCGIL24DSO |
| CHCGILABDSO: 312-637 | CHCGIL24DSO |
| CHCGILABDSO: 312-638 | CHCGIL24DSO |
| CHCGILABDSO: 312-752 | CHCGIL24DSO |
| CHCGILABDSO: 312-892 | CHCGIL24DSO |
| CHCGILABDSO: 312-893 | CHCGIL24DSO |

ASSIGN ROUTING METHOD:
FGD (ORS/RTS)
ICA (PRE-ROUTE)
CHCGIL24DSO
EKGVIL00058
EKGVIL00059

DO NOT ROUTE
REASON FOR "DO NOT ROUTE":

ALL | CLEAR

ALL | CLEAR

EXECUTE | CANCEL

FIG. 9

CARRIER ADD [ CLEC #04 / NYCPNY00162 / NEW YORK ]

| | | | SWITCH INFO | ORDER INFORMATION |
|---|---|---|---|---|
| DEST MARKET: | NEW YORK | QUERY SWITCHES | CLLI | ORDER DATE: ORDER CUST: |
| TRAFFIC TYPE: | TRANSIT | VALIDATE ORDER | CUSTOMER: | ORDER REP: ORDER MKT: |
| SWITCH: | NYCPNY00162 | | ORIG MARKET: | EMAIL: |
| METASOLV ORDER#: | 0 | | | |

AVAILABLE SWITCHES

| | | | | |
|---|---|---|---|---|
| CAB #01 | BTHPNY00182 | YES | (11 OF 14) | |
| CAB #01 | BTHPNY03355 | YES | (31 OF 48) | |
| CAB #01 | HCVLNY00352 | YES | (2 OF 2) | |
| CAB #01 | HCVLNY00353 | YES | (4 OF 4) | |
| CAB #01 | HCVLNY00354 | YES | (24 OF 26) | |
| CAB #01 | HCVLNY00356 | YES | (4 OF 5) | |
| CAB #01 | HCVLNY00566 | YES | (1 OF 5) | |
| CAB #01 | WHPLNY00357 | YES | (2 OF 2) | |
| CAB #01 | WHPLNY01514 | YES | (1 OF 1) | |
| CLEC #02 | NYCMNY00149 | NO | (0 OF 66) | |
| CLEC #03 | HNTNNY00170 | YES | (28 OF 28) | |
| CLEC #03 | NYCMNY00164 | YES | (21 OF 22) | |
| CLEC #03 | NYCMNY00165 | YES | (36 OF 36) | |
| CLEC #03 | NYCMNY00166 | YES | (6 OF 7) | |
| CLEC #03 | NYCMNY00167 | YES | (3 OF 4) | |
| CLEC #03 | NYCMNY00171 | YES | (7 OF 7) | |
| CLEC #03 | NYCMNY00172 | YES | (3 OF 3) | |

CURRENTLY ROUTING

ELFRNYAWCM0: 646-721
NYCMNY54DS3: 212-471
NYCMNY54DS3: 212-803
NYCMNY54DS3: 212-882
NYCMNY54DS3: 516-203
NYCMNY54DS3: 646-259
NYCMNY54DS3: 646-284
NYCMNY54DS3: 646-746
NYCMNY54DS3: 718-374
NYCMNY54DS3: 718-506
NYCMNY54DS3: 718-508
NYCMNY54DS3: 718-530
NYCMNY54DS3: 718-640
NYCMNY54DS3: 718-666
NYCMNY54DS3: 718-685
NYCMNY54DS3: 718-688
NYCMNY54DS3: 718-713

AVAILABLE NPANXX(s)

NYCMNY54DS3: 718-807

ALL   1/2   1/3   CLEAR

PENDING NPANXX(s)

ALL   CLEAR

REQ DUE DATE:
REP PHONE#: 312-384-804

RECORD AS DIRECT CONNECT

NOTES: [CLEC #03-NYCMNY00164]
[ELFRNYAWCM0]: NO NOTES
[NYCMNY54DS3]: NO NOTES

E-MAIL OPTIONS
☐ ASR   ENTER ASR DATA
☑ GENERATE E-MAIL
TEMPLATE: 1 - CARRIER ADD - NEW CARRIER, SINGLE SWITCH

SAVE & CLOSE   CANCEL

FIG. 10

ASR / NYCPNY00162 2600 - CA / CLEC #04

CUSTOMER: CLEC #04
ORIG CLLI: NYCPNY00162
PON: NYCPNY00162 26600 - CA

| MAIN ASR DATA | CONTACT INFO |

MAIN ASR DATA:

DESIRED DUE DATE: |
ACT:
LATA: | NEUTRAL TANDEM |
CUSTOMER:
PSL:
ACTL:

SERVICE DETAILS:

PRI ADM:
DNPA/NXX:
CSL:
CST:
CSPC:
SECLOC:

OTHER MAIN ASR DATA:

CCNA: OWS      D/TSENT: 8/29/2006     PSL I: E      PLU: 100
VER: AA        REQTYP: MD             UNIT: C       LTP: BF
CC: 505B       RTR: S                 PIU: 0        BAN: N

REMARK 1:

REMARK 2: THIS CARRIER MAY BE DIRECT CONNECT WITH YOUR COMPANY. IN THIS CASE PLEASE CHOOSE NEUTRAL TANDEM AS 2ND CHOICE FOR OVER FLOW. THANK YOU.

[ OK ]   [ CANCEL ]   [ PREVIEW ASR ]

FIG. 11

ASR / NYCPNY00162 2600 - CA / CLEC #04

CUSTOMER: CLEC #04
ORIG CLLI: NYCPNY00162
PON: NYCPNY00162 26600 - CA

| MAIN ASR DATA | CONTACT INFO |

BILL SECTION:

| | |
|---|---|
| BILLMN: | NEUTRAL TANDEM |
| SBILLNM: | ACCOUNTS PAYABLE |
| ACNA: | OWS |
| STREET: | ONE SOUTH WACKER |
| FLOOR: | 2 |
| ROOM: | 200 |
| CITY: | CHICAGO |
| STATE: | IL |
| ZIP: | 60606 |
| BILLCON: | TOM BILLING |
| TEL.-NO: | 312-384-8000 |

INIT CONTACT:

| | |
|---|---|
| CONTACT: | TIM CONTACT |
| TEL NO: | 312-384-8000 |
| FAX NO: | 312-346-1234 |
| EMAIL: | timcontact@neutraltandem.com |
| STREET: | ONE SOUTH WACKER |
| FLOOR: | 2 |
| ROOM: | 200 |
| CITY: | CHICAGO |
| STATE: | IL |
| ZIP: | 60606 |

DSG:

| | |
|---|---|
| CONTACT: | |
| STREET: | ONE SOUTH WACKER |
| FLOOR: | 2 |
| ROOM: | 200 |
| CITY: | CHICAGO |
| STATE: | IL |
| ZIP: | 60606 |

IMPCON:

| | |
|---|---|
| CONTACT: | TECH ON DUTY |
| TEL NO: | |

[ OK ]  [ CANCEL ]  [ PREVIEW ASR ]

FIG. 12

ACCESS SERVICE REQUEST

NEUTRAL TANDEM

ACCESS SERVICE REQUEST

ADMINISTRATIVE SECTION OWS    CCNA: OWS    PON: CHCGILABDSO 2600-CA    QA:    CBD:    DDD:    VER: AA    ASR NO:    FDT:    SPA:    ICSC:

CC: 505B    UNE:    D/TSENT: 2/16/2006
CNO:    PPTD:    PFPTD:    NOR:    LUP:    BSA:    REQTYP: MD    ACT:    ACTI:    QSA:    WST:    LATA:

RTR: S    SUP:    AFO:    QNAI:    TQ:    EXP:    AENG:    ALBR:    AGAUTH:    DATED:    CUST: NEUTRAL TANDEM

LA:    LADATED:    LANM:
FBA:    EF:    DT:    MUX:    FNI:    CFNI:

CKR:                            PSL:                                PSLI: E    PIU: C  0    PLU: 100

LTP:                                                                UNIT:                    QTY:
BF:
QTY: N    BAN:            ASG:    BIC:    BICTEL:            TSC:        WSTN:

ACTL:            PBT:    AI:    APOT:            RORD:                AFG:        SPEC:
CCVN:    ASC-EC:    TSP:            SAN:            BICID:                RPCN:

REMARKS:
THIS CARRIER MAY BE DIRECT CONNECT WITH YOUR COMPANY. IN THIS CASE PLEASE CHOOSE NEUTRAL TANDEM AS 2ND CHOICE FOR OVER FLOW. THANK YOU.

BILLNM: NEUTRAL TANDEM                    SBILLNM: ACCOUNTS PAYABLE                ACNA: OWS    TE:
BILL SECTION
EBP:    STREET: ONE SOUTH WACKER            FLOOR: 2    ROOM: 200    CITY: CHICAGO
        BILLCON:                            TELNO: 312-384-8035
STATE: IL    ZIP: 60606    BILLCON: JON CLOPTON                        VTA:
VCVTA:                IWBAN:

TUESDAY, AUGUST 28, 2006                                    PAGE 1 OF 6

TANDEM MANAGER

☑ REMOTE MARKETS | SWITCH NOTES | CODES OWNED | ROUTING MATRIX | TRUNK GROUPS | INVOICING

ALL CUSTOMER TYPES
CUSTOMER LIST
- VOIP #04
- WIRELESS #01
- WIRELESS #02
- WIRELESS #03
- WIRELESS #04
- WIRELESS #05
- WIRELESS #06
- WIRELESS #07
- WIRELESS #08
- WIRELESS #09
- WIRELESS #10

+ / ✎ ✗  ⊞ ROUTING

(ALL MARKETS)
MARKET CUSTOMERS
- WIRE #06 / AKRON OH
- WIRE #06 / ATLANTA
- WIRE #06 / CHAMPAIGN
- WIRE #06 / CHICAGO
- WIRE #06 / CINCINNATI
- WIRE #06 / CLEVELAND
- WIRE #06 / COLUMBUS
- WIRE #06 / CONNECTIC
- WIRE #06 / DAYTON OH
- WIRE #06 / DETROIT
- WIRE #06 / EAU CLAIRE

+ / ✎ ✗  ⊞ ROUTING

ACTIVE SWITCHES
CUSTOMER SWITCHES
- + BURGIL00118
- + BURGIL00119
- + BURGIL00195
- + BURGIL01413
- + BURGIL01415
- + SCBGIL00157
- + SCBGIL00158
- + SCBGIL00613
- + SCBGIL01412
- + SCBGIL01414
- + WCHCIL01209

+ / ✎ ✗  🔍  ⊞ ROUTING

INVOICE DATE
- 08/27/2006
- 07/27/2006
- 06/27/2006
- 05/27/2006
- 04/27/2006
- 03/27/2006
- 02/27/2006
- 01/27/2006
- 12/27/2006
- 11/27/2006
- 10/27/2006

REPORTS:
| | BILLABLE USAGE | BILLABLE USAGE |
|---|---|---|
| TRANSIT / RTS | ☑ | ☐ |
| NTS | ☐ | ☐ |
| ORIG ACCESS | ☐ | ☐ |
| TERM ACCESS | ☐ | ☐ |
| IPTERM / ENHSV | ☐ | ☐ |
| VOIP | ☐ | ☐ |
| ILEC OVERFLOW | ☐ | ☐ |
| HLR DIPS | ☐ | |

GLOBAL CUST NAME: WIRELESS #06
SHORT NAME: WIRE #06
CUST TYPE: WIRELESS
GENERATE AUR:

MARKET CUST NAME: WIRELESS #06
E-MAIL ADDRESS: NAME@CUSTOMER.COM
GENERATE ASR:
OCN / RAD / VOIPID: 6534

CLLI: BURGIL00118
STATUS: ACTIVE
OCN / RAO: 6534
SWITCH TYPE: IN / OUT
CONNECTED: ☑  V/POI: ☐
IN: ☑   ORS: ☐
OUT: ☑  PRERT: ☐
NETWORKS: ☐  IMT: ☐
COMMENTS:

| | # DIPS | # CALLS | # MINUTES | # OVERFLOW MINUTES |
|---|---|---|---|---|
| TRANSIT / RTS: | 54 | 14,410,124 | 39,058,321 | |
| NTS: | | 0 | 0 | |
| ORIG ACCESS: | 0 | 0 | 0 | |
| TERM ACCESS: | | | | |
| IP TERM: | | | | |
| VOIP: | | | | |
| CLEC OVERFLOW: | | | | |
| HLR DIP: | | | | |

[BUILD CUSTOMER MARKET]  [MANAGE CODES OWNED]  [PERFORM CARRIER ADD]

FIG. 15

TANDEM MANAGER -- INVOICE GENERATION

GENERATE INVOICES

| MARKET | CUSTOMER NAME | LATEST INVOICE |
|---|---|---|
| ATLANTA | CABLE #01 | 8/27/2006 |
| BOSTON | CABLE #02 | 8/27/2006 |
| CHICAGO | CABLE #03 | 8/27/2006 |
| CINCINNATI | CLEC #01 | 8/27/2006 |
| CLEVELAND | CLEC #02 | 8/27/2006 |
| COLUMBUS | CLEC #03 | 8/27/2006 |
| CONNECTICUT | CLEC #04 | 8/27/2006 |
| DETROIT | CLEC #05 | 8/27/2006 |
| INDIANAPOLIS | CLEC #06 | 8/27/2006 |
| LOS ANGELES | CLEC #07 | 8/27/2006 |
| MIAMI | CLEC #08 | 8/27/2006 |
| MILWAUKEE | VOIP #01 | 8/27/2006 |
| MINNEAPOLIS | VOIP #02 | 8/27/2006 |
| NEW YORK | VOIP #03 | 8/27/2006 |
| TAMPA | VOIP #04 | 8/27/2006 |
| WASHINGTON DC | WIRELESS #01 | 8/27/2006 |

SELECT ALL   CLEAR ALL   GENERATE PDF   ☐ VIEW PDFS

CUSTOMER:
EARLIEST DATE:
LATEST DATE:

TRANSIT:
EXT METRO:
ORIG ACCESS:
TERM ACCESS:

DIPS   #CALLS   #MINUTES   #OVERFLOW MIN

INVOICE CYCLE DATE: 8/27/2006   GENERATE INVOICES

INVOICING LOG:

1:08:32 PM -- GENERATING INVOICES FOR: CLEC #01
1:08:32 PM -- FINISHED INVOICES FOR: CLEC #01
1:08:32 PM -- GENERATING INVOICES FOR: CLEC #02
1:08:32 PM -- FINISHED INVOICES FOR: CLEC #02
1:08:32 PM -- GENERATING INVOICES FOR: CABLE #01
1:08:32 PM -- FINISHED INVOICES FOR: CABLE #01
1:08:32 PM -- GENERATING INVOICES FOR: CABLE #02
1:08:32 PM -- FINISHED INVOICES FOR: CABLE #02
1:08:32 PM -- GENERATING INVOICES FOR: WIRELESS #01
1:08:32 PM -- FINISHED INVOICES FOR: WIRELESS #01

FIG. 16

TANDEM MANAGER -- INVOICE GENERATION

GENERATE INVOICES

| MARKET | CUSTOMER NAME | LATEST INVOICE |
|---|---|---|
| ATLANTA | CABLE #01 | 8/27/2006 |
| BOSTON | CABLE #02 | 8/27/2006 |
| CHICAGO | CABLE #03 | 8/27/2006 |
| CINCINNATI | CLEC #01 | 8/27/2006 |
| CLEVELAND | CLEC #02 | 8/27/2006 |
| COLUMBUS | CLEC #03 | 8/27/2006 |
| CONNECTICUT | CLEC #04 | 8/27/2006 |
| DETROIT | CLEC #05 | 8/27/2006 |
| INDIANAPOLIS | CLEC #06 | 8/27/2006 |
| LOS ANGELES | CLEC #07 | 8/27/2006 |
| MIAMI | CLEC #08 | 8/27/2006 |
| MILWAUKEE | VOIP #01 | 8/27/2006 |
| MINNEAPOLIS | VOIP #02 | 8/27/2006 |
| NEW YORK | VOIP #03 | 8/27/2006 |
| TAMPA | VOIP #04 | 8/27/2006 |
| WASHINGTON DC | WIRELESS #01 | 8/27/2006 |

SELECT ALL    CLEAR ALL    GENERATE PDF    ☐ VIEW PDFS

INVOICE CYCLE DATE: 8/27/2006    GENERATE INVOICES

INVOICING LOG:

CUSTOMER:
EARLIEST DATE:
LATEST DATE:

| # DIPS | # CALLS | # MINUTES | # OVERFLOW MIN |
|---|---|---|---|
| | | | |
| | | | |

TRANSIT:
EXT METRO:
ORIG ACCESS:
TERM ACCESS:

FIG. 17

TANDEM MANAGER - - INVOICE REPORTING

| ATLANTA | 8/27/2006 |
| BOSTON | 7/27/2006 |
| CHICAGO | 6/27/2006 |
| CINCINNATI | 5/27/2006 |
| CLEVELAND | |
| COLUMBUS | |
| CONNECTICUT | |
| DETROIT | |
| INDIANAPOLIS | |
| LOS ANGELES | |
| MIAMI | |
| MILWAUKEE | |

REVERSE USAGE DETAIL REPORTS
- ☐ TERM OCN / ORIG OCN
- ☐ TERM CLLI / ORIG OCN
- ☐ TERM CLLI
- ☐ CUSTOMER SUMMARY

INVOICE SUMMARY REPORTS
- ☐ SUMMARY BY CUSTOMER
- ☐ SUMMARY BY CUST / CLLI
- ☐ SUMMARY BY SEC. CALLTYPE

FIG. 18

| MARKET: | CLEC #01 CHICAGO | | | |
|---|---|---|---|---|
| CUSTOMER #: | 7058 | | | |
| INVOICE DATE: | 8/27/2006 | *** USAGE SUMMARY -- TRANSIT *** | | |

| SWITCH CLLI | OCN | LRN DIPS | CALLS | MINUTES |
|---|---|---|---|---|
| CHCGIL | 772 CHICAGO | | | |
| | 000 | 201 | 50,283 | 92,809 |
| | 232 | 0 | 8,865 | 19,592 |
| | 249 | 353 | 13,863 | 29,146 |
| | 460 | 66 | 55,305 | 123,164 |
| | 471 | 166 | 25,095 | 80,158 |
| | 544 | 6 | 448 | 830 |
| | 591 | 1,296 | 39,830 | 92,447 |
| | 611 | 564 | 11,902 | 138,458 |
| | 623 | 1,118 | 196,662 | 319,786 |
| | 633 | 4,625 | 194,722 | 392,595 |
| | 650 | 16,614 | 163,659 | 324,503 |
| | 652 | 12,462 | 250,077 | 442,895 |
| | 653 | 845 | 270,343 | 483,684 |
| | 705 | 0 | 22,235 | 44,683 |
| | 706 | 403 | 39,343 | 115,879 |
| | 713 | 1,941 | 149,438 | 476,147 |
| | 719 | 111 | 64,892 | 219,421 |
| | 760 | 714 | 48,877 | 96,977 |
| | 772 | 27 | 62 | 135 |
| | 776 | 17 | 50,717 | 93,821 |
| | 856 | 10,561 | 162,527 | 308,367 |
| | 870 | 0 | 12,884 | 25,790 |
| | 895 | 4 | 26,497 | 62,225 |
| | 999 | 172 | 421 | 709 |
| | | 52,285 | 1,858,947 | 3,974,221 |

MONDAY, SEPTEMBER 11, 2006                                         PAGE 1 OF 3

FIG. 19

MARKET: CLEC #01 CHICAGO
CUSTOMER #: 7058
INVOICE DATE: 8/27/2006

\*\*\* REVERSE USAGE SUMMARY -- TRANSIT \*\*\*

| SWITCH CLLI | OCN | CALLS | MINUTES |
|---|---|---|---|
| CHCGIL 772 CHICAGO | 249 | 28,182 | 50,939 |
| | 460 | 115,049 | 282,021 |
| | 471 | 31,638 | 88,468 |
| | 544 | 158 | 549 |
| | 591 | 110,356 | 216,098 |
| | 623 | 456,059 | 1,642,206 |
| | 650 | 696,765 | 4,182,199 |
| | 652 | 1,065,565 | 4,836,112 |
| | 653 | 834,431 | 2,942,807 |
| | 705 | 35,879 | 180,303 |
| | 705 | 95,591 | 302,509 |
| | 719 | 79,960 | 240,698 |
| | 760 | 172,658 | 1,438,425 |
| | 760 | 57 | 529 |
| | 772 | 46 | 94 |
| | 776 | 162,789 | 689,339 |
| | 856 | 723,753 | 3,933,629 |
| | 870 | 23,300 | 162,546 |
| | 895 | 42,778 | 79,366 |
| | | 4,675,014 | 21,268,837 |

MONDAY, SEPTEMBER 11, 2006          PAGE 1 OF 3

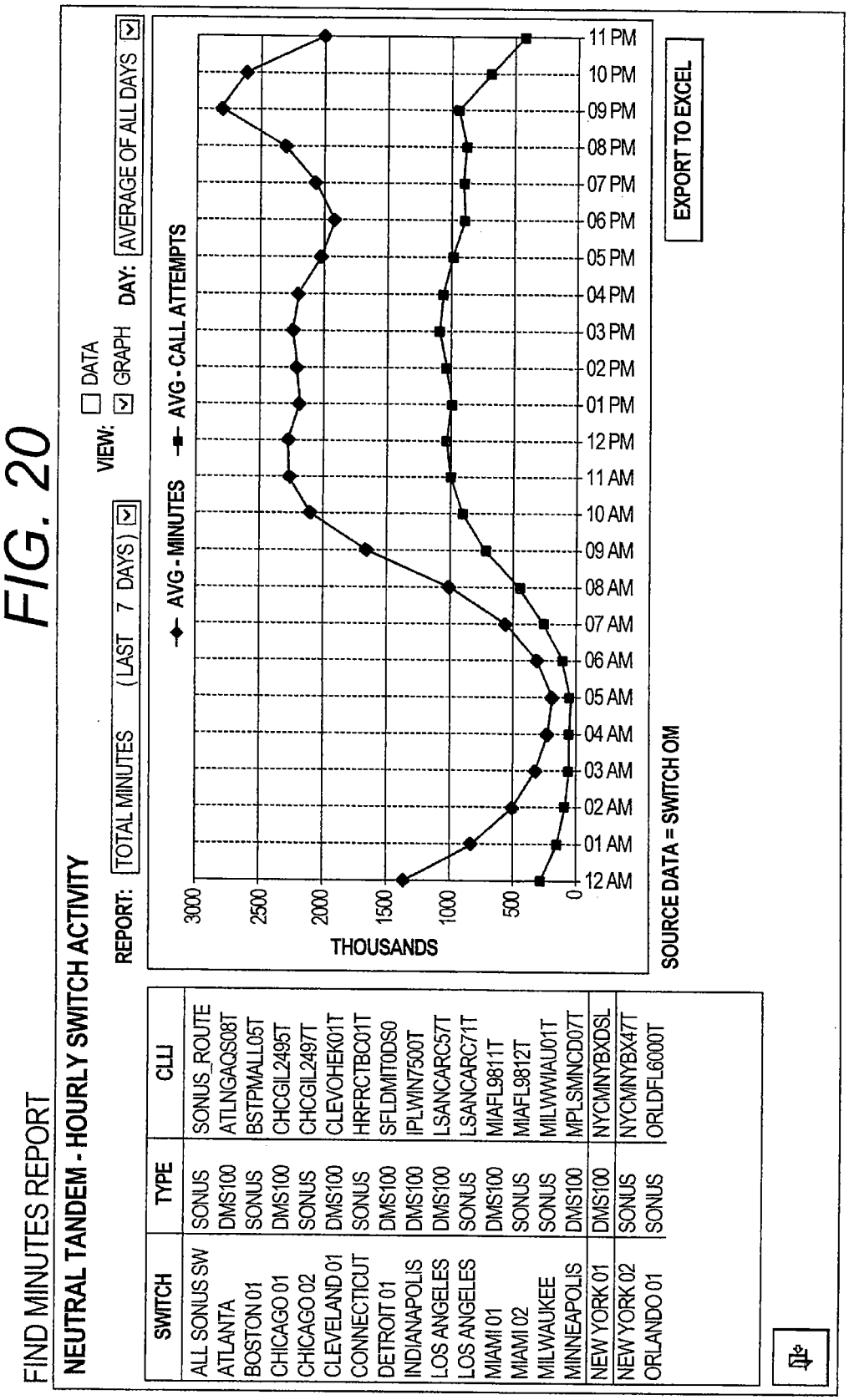

FIG. 21

FIND MINUTES REPORT

NEUTRAL TANDEM - HOURLY SWITCH ACTIVITY

REPORT: TOTAL MINUTES (LAST 7 DAYS) ▼    VIEW: ☑ DATA ☑ GRAPH    DAY: AVERAGE OF ALL DAYS ▼

| SWITCH | TYPE | CLLI | | SUN | MON | TUE | WED | THU | FRI | SAT | AVERAGE |
|---|---|---|---|---|---|---|---|---|---|---|---|
| ALL SONUS SW | SONUS | SONUS_ROUTE | 00 | 1,480,232 | 1,455,275 | 1,311,570 | 1,267,425 | 1,300,544 | 1,276,575 | 1,445,240 | 1,362,409 |
| ATLANTA | DMS100 | ATLNGAQS08T | 01 | 1,025,290 | 1,008,555 | 789,353 | 727,048 | 734,297 | 725,043 | 920,850 | 847,205 |
| BOSTON 01 | SONUS | BSTPMALL05T | 02 | 665,595 | 650,298 | 456,915 | 423,112 | 419,826 | 428,377 | 573,467 | 516,799 |
| CHICAGO 01 | DMS100 | CHCGIL2495T | 03 | 440,615 | 422,197 | 283,107 | 273,622 | 271,662 | 275,512 | 382,672 | 335,627 |
| CHICAGO 02 | SONUS | CHCGIL2497T | 04 | 310,560 | 301,625 | 204,657 | 195,773 | 202,975 | 211,542 | 278,683 | 243,688 |
| CLEVELAND 01 | DMS100 | CLEVOHEK01T | 05 | 236,903 | 241,070 | 189,588 | 199,492 | 204,413 | 216,720 | 233,600 | 217,398 |
| CONNECTICUT | SONUS | HRFRCTBC01T | A 06 | 256,235 | 260,862 | 340,682 | 370,445 | 382,238 | 382,661 | 306,845 | 328,567 |
| DETROIT 01 | DMS100 | SFLDMIT0DS0 | M 07 | 451,950 | 369,745 | 615,917 | 656,325 | 680,137 | 665,177 | 558,908 | 571,166 |
| INDIANAPOLIS | DMS100 | IPLWIN7500T | 08 | 854,453 | 653,055 | 1,111,135 | 1,145,937 | 1,171,590 | 1,152,603 | 1,033,660 | 1,017,490 |
| LOS ANGELES | DMS100 | LSANCARC57T | 09 | 1,404,808 | 1,103,466 | 1,880,403 | 1,886,985 | 1,896,912 | 1,912,522 | 1,625,526 | 1,672,946 |
| LOS ANGELES | SONUS | LSANCARC71T | 10 | 1,863,388 | 1,505,068 | 2,325,532 | 2,343,748 | 2,310,675 | 2,304,392 | 2,077,994 | 2,104,400 |
| MIAMI 01 | DMS100 | MIAFL9811T | 11 | 2,102,220 | 1,725,270 | 2,502,420 | 2,468,343 | 2,418,701 | 2,416,837 | 2,255,843 | 2,269,948 |
| MIAMI 02 | SONUS | MIAFL9812T | 12 | 2,155,924 | 1,761,017 | 2,542,273 | 2,485,775 | 2,397,258 | 2,377,455 | 2,279,038 | 2,285,534 |
| MILWAUKEE | SONUS | MILWWIAU01T | 13 | 2,144,512 | 1,674,831 | 2,435,172 | 2,363,872 | 2,291,660 | 2,255,534 | 2,163,280 | 2,189,837 |
| MINNEAPOLIS | DMS100 | MPLSMNCD07T | 14 | 2,086,058 | 1,569,527 | 2,541,495 | 2,442,943 | 2,395,636 | 2,363,900 | 2,068,151 | 2,209,673 |
| NEW YORK 01 | DMS100 | NYCMNYBXDSL | 15 | 2,036,297 | 1,503,473 | 2,652,398 | 2,587,912 | 2,517,807 | 2,506,819 | 1,958,057 | 2,251,823 |
| NEW YORK 02 | SONUS | NYCMNYBX47T | 16 | 1,966,158 | 1,442,892 | 2,624,079 | 2,557,712 | 2,517,528 | 2,449,500 | 1,892,327 | 2,207,171 |
| ORLANDO 01 | SONUS | ORLDFL6000T | P 17 | 1,926,734 | 1,411,690 | 2,354,487 | 2,271,285 | 2,230,002 | 2,145,395 | 1,848,338 | 2,026,847 |
| | | | M 18 | 2,018,559 | 1,475,037 | 2,104,984 | 2,023,580 | 1,984,195 | 1,943,896 | 1,869,605 | 1,917,122 |
| | | | 19 | 2,240,975 | 1,751,650 | 2,263,673 | 2,184,439 | 2,143,157 | 2,003,167 | 1,966,938 | 2,079,143 |
| | | | 20 | 2,603,635 | 2,063,388 | 2,446,057 | 2,422,813 | 2,365,096 | 2,116,792 | 2,194,035 | 2,315,974 |
| | | | 21 | 2,774,081 | 2,729,778 | 3,076,769 | 3,082,376 | 3,048,719 | 2,690,261 | 2,394,504 | 2,828,070 |
| | | | 22 | 2,488,291 | 2,552,261 | 2,776,459 | 2,833,937 | 2,813,326 | 2,584,718 | 2,327,140 | 2,625,162 |
| | | | 23 | 1,879,000 | 1,965,368 | 2,062,334 | 2,081,852 | 2,044,686 | 2,056,835 | 1,965,663 | 2,007,963 |

SOURCE DATA = SWITCH OM

EXPORT TO EXCEL

SYSTEM AND METHODS FOR MANAGING TANDEM SWITCH INFORMATION

CROSS-REFERENCE TO RELATED APPLICATION

This patent application claims the benefit of U.S. Provisional Patent Application Ser. No. 60/827,907, filed Oct. 3, 2006, which is incorporated herein by reference in its entirety.

TECHNICAL FIELD

The present invention relates to the field of telecommunications, and more particularly to automation and management of trunk routing among tandem switches in a telecommunications network.

BACKGROUND

The following background information will be helpful in understanding the field of telecommunications as it relates to the present invention.

1. Acronyms

The written description herein may contain acronyms that refer to various telecommunications services, components and techniques, as well as features relating to the present invention. Although some of these acronyms are known, use of these acronyms is not strictly standardized in the art. Accordingly, for purposes of the written description herein, the acronyms are defined as follows:
   Access Service Request (ASR)
   Call Detail Record (CDR)
   Central Exchange Service (Centrex)
   Carrier Identification Code (CIC)
   Competitive Local Exchange Carrier (CLEC)
   Generic Access Profile (GAP)
   Grade of Service (GOS)
   Graphical User Interface (GUI)
   Incumbent Local Exchange Carrier (ILEC)
   Interexchange Carrier (IXC)
   Internet Service Provider (ISP)
   Local Exchange (NXX)
   Local Exchange Routing Guide (LERG)
   Local Routing Number (LRN)
   Numbering Plan Area (NPA)
   Plain Old Telephone Service (POTS)
   Point of Interface (POI)
   Private Branch Exchange (PBX)
   Public Switched Telephone Network (PSTN)
   Release (REL)
   Release Complete (RLC)
   Service Control Point (SCP)
   Service Switching Point (SSP)
   Signaling System 7 (SS7)
   Signaling Transfer Point (STP)
   Transmission Control Protocol/Internet Protocol (TCP/IP)
   Trunk Circuit Identification Code (TCIC)
   Trunk Integrated Records Keeping System (TIRKS)
   Total Network Data System (TNDS)

2. Background Information

In its most basic sense, a telephone call is placed from an origination point (call origin) and is connected to a destination point (call destination). The origination point will be associated with an originating end office and the destination point will be associated with a destination or terminating end office. A telecommunications network is utilized to effectuate a connection between the end offices, and ultimately between the origination and destination points. An important component of this network is the public switched telephone network (PSTN). The PSTN generally consists of a series of switches capable of logically routing calls through the telecommunications network based, in part, on information relating to the call origin and the call destination.

The PSTN typically employs two types of switches within the network: (1) Class 5 switches (also known as an end office switch, telephone company end office switch, central office switch, Class 5 office switch, or a service switching point (SSP)), and (2) Class 4 switches, also known as a tandem switch, which is an intermediate network switch. These switches are controlled by associated signaling transfer points (STPs) and service control points (SCPs), which provide instruction on call routing, as well as a variety of network implemented call services.

A telephone company end office (or central office) connects a network customers' telephone system to the PSTN via a Class 5 office switch. The network customers' telephone system may be a business telephone system, such as a Centrex or private branch exchange (PBX) system, or it may be a plain old telephone service (POTS) system, which is the telephone system utilized by most residential customers. Other customers may be entire networks, such as Internet service providers (ISP) and the like. The tandem switches are intermediate switches, incorporated in routing between the originating end office and the terminating end office. Communication lines, or trunks, are interconnected by one or more switches within the PSTN. A group of similar trunks that connect the same geographic locations are referred to as trunk groups. Depending on the volume of traffic, several trunk groups may simultaneously service two particular points in the PSTN.

Trunk groups are designed and implemented based on analysis of telecommunications traffic. Traffic associated with many trunk groups has significantly increased over the last several years due primarily to population growth in certain geographic regions. Trunk planners and network design engineers attempt to identify communications paths among switches that carry an especially high amount of traffic or load from point to point. Switches carrying especially high loads are connected with direct trunk groups, rather than trunk groups that may be routed indirectly between two geographic locations, to help alleviate traffic concerns. However, this is not always a viable and economical option. PSTN traffic continues to increase, due not only to population (network user) growth, but also due to the increasing number of interconnecting carriers utilizing the network. Such carriers include competitive local exchange carriers (CLECs), interexchange carriers (IXCs), wireless carriers, and independent carriers. These carriers also bring new traffic to the network and most depend largely on tandem switches as primary hubs. The increased traffic loads and carriers have spurred the addition of tandem switches and associated trunk groups without resort to analysis of traffic loads and routing. As a result, many times tandem switches and trunk groups are added to relieve overburdened resources, while other existing tandem switches and trunk groups are not being used to their fullest capacity. This misuse of resources is due to the limited ability to accurately quantify and analyze the actual traffic loads at each tandem switch. And because most of the costs associated with network and switch expansion falls on the Incumbent Local Exchange Carrier (ILEC) (sometimes simply referred to as the Local Exchange Carrier (LEC)), the LECs typically pass these costs to other carriers in one form or another and may include increased charges associated with use of a particular LECs tandem switch.

The dynamic nature of network traffic, ownership of infrastructure, and government regulation, often creates opportunities for solutions to problems associated with traffic between end offices. Such opportunities for solutions include avoidance of associated expenses with particular tandem switches and off-load of traffic from exhausted tandem switches to increase traffic efficiency, i.e., purposeful or managed routing of call traffic via tandem switches. Many groups of commonly-situated members, particularly CLECs and wireless carriers, could benefit from such solutions to increase profit margins. With such a market defined, these solutions can often give birth to a new business model.

The present invention provides, among other things, business models, methods, software, and associated systems for quantifying, managing, directing, auditing, and analyzing the actual traffic loads of tandem switches and associated numbers and codes for a defined group. Among other things, this information can be used to minimize costs associated with tandem traffic for the defined group—made up of subscribers or members—by purposely routing subscriber traffic flow through switches owned by a subscriber or a third-party tandem manager as opposed to switches owned by a particular LEC or non-subscriber entity.

Other aspects of the present invention will become apparent and be more fully understood from the drawings, descriptions, and claims set forth herein.

SUMMARY OF THE INVENTION

A system and associated methods for automation and management of trunk routing among switches in a telecommunications network between carriers connected to a third party tandem services provider or manager (a "neutral tandem network.")

According to a particular aspect of the invention, the system and associated methods can be used to effectuate a business model for providing preferred rates, or other preferences, to a defined group of members or subscribers by managing and directing subscriber-associated call traffic from subscriber-owned switches to one or more tandem switches owned by a third-party tandem managing entity other than a LEC or ILEC. Members benefit from utilizing one or more access tandem switches owned and/or operated by a third party tandem manager by avoiding higher fees typically associated with LEC-owned and operated access tandem switches. The third-party tandem manager benefits by collecting a usage fee which is less than the LEC fees charged for LEC-owned tandem switches.

The management system includes information management methods preferably implemented by software for effectuating the business model. The management system provides for additional functions, such as switch traffic analysis and data tracking.

BRIEF DESCRIPTION OF DRAWINGS

FIG. 1 is a schematic diagram of a network switch relationship from the end office perspective of a particular geographic region a portion in accordance with the principles of the present invention.

FIG. 2 is a schematic diagram of some components of a tandem management system in accordance with the principles of the present invention.

FIG. 3 is a block diagram illustrating the basic software modules of the tandem manager of the tandem management system shown in FIG. 2.

FIG. 4 is an illustration or screenshot of a GUI of the tandem manager shown in FIG. 3.

FIG. 5 is a block diagram illustrating the main functional components of the Customer Management Module.

FIG. 6 is an illustration or screenshot of a GUI for the Main Customer Screen with the Codes Owned Tab selected.

FIG. 7 is an illustration or screenshot of a GUI for the Main Customer Screen with the Routing Matrix Tab selected.

FIG. 8 is an illustration or screenshot of a GUI for the Manage Codes function.

FIG. 9 is an illustration or screenshot of a GUI for the Carrier Add function.

FIG. 10 is an illustration or screenshot of a GUI for an ASR data screen with the Main ASR Data Tab selected.

FIG. 11 is an illustration or screenshot of a GUI for an ASR data screen with the Contact Info Tab selected.

FIG. 12 is an illustration of a typical ASR form.

FIG. 13 is an illustration or screenshot of a GUI for the Main Customer Screen with the Trunk Groups Tab selected.

FIGS. 14-17 are respective illustrations or screenshots of GUIs for the invoice functionality of the tandem manager.

FIGS. 18-19 are respective illustrations of sample customer invoices/reports.

FIGS. 20-21 are respective illustrations of sample switch activity reports.

DETAILED DESCRIPTION OF PREFERRED EMBODIMENTS

The description that follows describes, illustrates and exemplifies one or more particular embodiments of the present invention in accordance with its principles. This description is not provided to limit the invention to the embodiments described herein, but rather to explain and teach the principles of the invention in such a way to enable one of ordinary skill in the art to understand these principles and, with that understanding, be able to apply them to practice not only the embodiments described herein, but other embodiments that may come to mind in accordance with these principles. The scope of the present invention is intended to cover all such embodiments that may fall within the scope of the appended claims, either literally or under the doctrine of equivalents.

It should be noted that in the description and drawings, like or substantially similar elements may be labeled with the same reference numerals. However, sometimes these elements may, but not always, be labeled with differing numbers in cases where such labeling may facilitate a more clear description. Additionally, the drawings set forth herein are not necessarily drawn to scale, and in some instances proportions may have been exaggerated to more clearly depict certain features.

Various aspects of the present invention are born out of concepts of information management associated with one or more switches, such as a tandem switch. Management of this information allows an entity or group to accomplish many things, including, but not limited to: (1) auditing of traffic activity on one or more particular switches; (2) control, routing, and transfer of traffic from exhausted tandem switches to under-utilized tandem switches to increase traffic efficiency; (3) control of traffic for defined members or subscribers of a group, such as a group of CLEC and wireless carrier customers; and (4) routing of subscriber traffic flow through subscriber-owned switches, or a third-party-tandem-manager-owned switch, as opposed to switches owned by a particular LEC or non-subscriber entity to effectuate cost savings and switching efficiency.

According to a particular aspect of the present invention, information management associated with one or more tandem switches gives rise to a business model for providing preferred rates, or other preferences, to a defined group of members or subscribers associated with tandem switch usage by managing and directing subscriber-associated call traffic from subscriber-owned switches to one or more tandem switches owned by a third-party tandem managing entity other than a LEC or ILEC (hereinafter referred to as a tandem manager, third-party tandem manager or third-party tandem service provider). In a preferred embodiment, the subscriber group is made up of CLECs and wireless carriers that operate and/or own one or more end office switches within the PSTN. Members benefit from utilizing one or more access tandem switches owned and/or operated by a third party tandem manager by avoiding higher fees typically associated with LEC-owned and operated access tandem switches. The third-party tandem manager benefits by collecting a usage fee which is less than the LEC fees charged for LEC-owned tandem switches.

The tandem manager provides a tandem access hub to which subscriber carriers can connect to, and have calls originating within the subscriber carrier's network distributed to, the proper switches as needed to complete the calls to their respective destination points. Carriers that subscribe to the tandem manager service not only benefit from lower fees (such as toll fees) associated with calls originating within their own networks, but also lower fees associated with calls to numbers owned by them that are placed within other subscriber carrier networks.

To orchestrate management of call traffic for the subscribers such that it is properly connected and distributed via the tandem manager tandem access hub or switch, the tandem manager utilizes methods to coordinate, audit, organize and manage subscriber number and switch information. In a preferred embodiment, the primary subscriber data or information relied upon are NPA-NXX codes for all subscriber-owned numbers. The "NPA-NXX" code represents the first 6 digits of a telephone number, starting with the area code. The "NPA" refers to "Number Plan Area," commonly known as Area Code. "NXX" is the next finer number indicator within an Area Code and refers to a Central Office (or end office) of the phone service provider. Hence, by utilizing the NPA-NXX code, the tandem manager is able to determine the subscriber that owns the telephone number. The tandem manager keeps track of all NPA-NXX codes owned by subscribers to the system so that it can report these codes to all subscribers of the system and allow each subscriber switch to route all calls with these subscriber codes to the tandem manager tandem access switch. As a result, all participating subscribers will cooperate to direct all subscriber-code calls to the tandem manager tandem access switch, regardless of their point of origin, so that LEC-associated fees and tolls can be avoided. The LERG, or "Local Exchange Routing Guide," can be utilized to effectuate these relationships. The LERG is a Bellcore document that lists all North American Class 5 offices (Central Offices, or end offices) and describes their relationship to Class 4 offices (Tandem Offices). The LERG can be accessed on a regular basis to identify new/additional NPA-NXX codes and changes associated with subscriber switches so that this information can be utilized in the tandem manager service process.

FIG. 1 schematically illustrates a typical network switch relationship from the end office perspective of a particular geographic region. As shown in FIG. 1, a plurality of end office switches 30 are in networked communication with a set of tandem switches 32, which provide an access hub to the PSTN. The end office tandem switches include a wireless subscriber end office switch 34, a CLEC subscriber end office switch 36, and a non-subscriber end office switch 38. The set of tandem switches 32 include an FE-D LEC tandem 40, a LEC tandem 42, a tandem manager tandem 44, and an IXC tandem 46. The subscriber end office switches 34, 36 communicate with the tandem switches 30 in an order of preference, the first preference being given to the tandem manager tandem 44 by virtue of the subscriber status of the end office switches 34, 36. Each of the end office switches 34, 36 has access to an NPA-NXX table to verify whether a particular number is that of a subscriber. If a particular NPA-NXX is identified on the table, the call is then routed to the tandem manager tandem 44. If not, the call is routed to the LEC tandem 42.

As information relating to subscribers and their network of switches is obtained, organized, managed and updated, it is provided by the tandem manager to each of the switches 34, 36 so that the NPA-NXX table can be updated with the latest subscriber data. As shown schematically in FIG. 2, a tandem manager system 50 comprises a tandem manager 52 and a tandem manager database 54, which stores all data associated with the system, including subscriber switch data, subscriber code data (NPA-NXXs), etc. The tandem manager 52 is also in communication with LERG 56, which provides data relating to routing information. As this data is collected, organized, managed and updated, it can be disseminated to subscribers so that future subscriber call traffic can be directed to the tandem manager tandem 44. The functionality and services provided by the tandem manager 52 are primarily driven by a tandem management system software application. In a preferred embodiment, the tandem management system software application provides GUIs, such as windows-based interfaces, for users to access and manage information. In a preferred embodiment, the software is developed on and Oracle database platform and a Visual Basic user interface platform.

Tandem Management System

In accordance with the principles of the present invention, and as shown in FIG. 3, methods of subscriber information management are preferably implemented through a software-enabled tandem manager system, preferably comprising a main Tandem Manager 102 and several modules, including a Customer Management Module 104, Control/Reference Data Module 106, Management/Operating Reporting Module 108, Custom Table View Module 110, and Other Function Module 112. To access these modules and their underlying functionality, a GUI is provided as shown in FIG. 4. The Tandem Manager 102 and the underlying modules can be used by a tandem manager (i.e., service provider) to manage information and functionality to effectuate the systems, methods, and business models in accordance with the principles of the present invention. Each of these modules will be described in more detail below.

Customer Management Module

As shown in FIG. 5, the Customer Management Module 104 includes access to the main functionality of the system: Main Customer Screen 120, Monthly LERG Reconciliation 122, and Invoice Generation 124.

Figure 6:
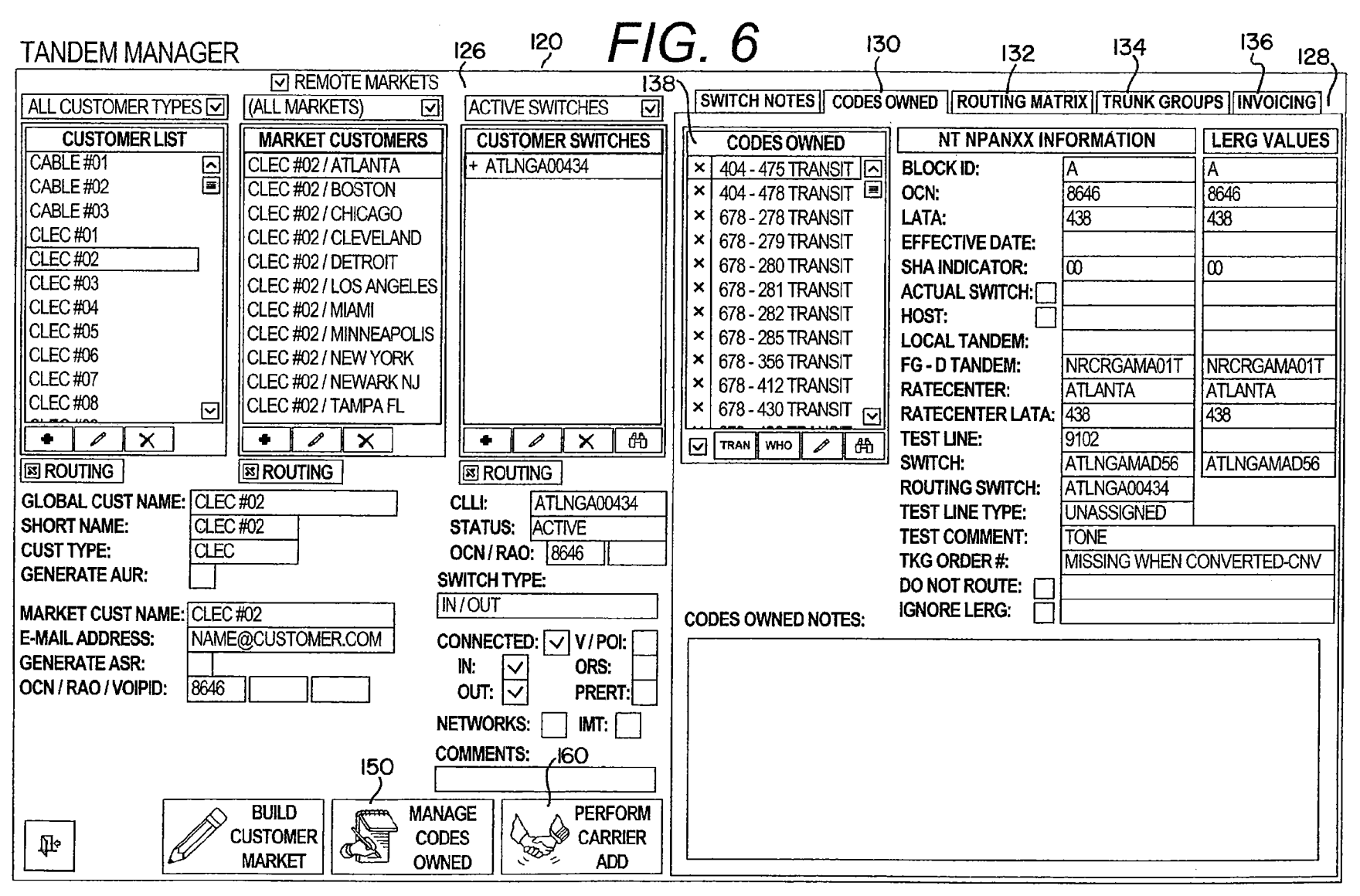

An example of the Main Customer Screen 120 is shown in FIG. 6. The screen is preferably organized in two sections: a "Customer/Market/Switch Management" section 126 (left half of the screen) and an "Activities and Data Management for a Selected Switch" section 128 (right half of the screen). The screen section 126 is used to first select a customer (subscriber) of the system from a Customer List, then a customer market (preferably defined by a geographic region) from a Customer Market list, and then a switch for that particular customer from a Customer Switch list. Once a particular switch is selected, the information for that switch can be accessed and managed. For example, once a switch is selected, the "Manage Codes Owned" function can be selected to allow management of codes for that particular switch or the "Perform Carrier Add" function can be selected to add subscriber carriers and their associated codes to that switch. The screen section 126 also allows management of customer data. With appropriate privileges, Customers, Customer Markets, and Customer Switches can be created, edited or deleted.

The "Activities and Data Management for a Selected Switch" section 128 of the screen is shown in FIG. 6 divided into multiple tabs: a Codes Owned Tab 130, a Routing Matrix Tab 132, a Trunk Groups Tab 134, and an Invoicing Tab 136. Once a particular switch has been selected in the section 126 of the screen, these tabs allow viewing and editing information for the codes, traffic, trunk groups, or other information relating to the selected switch.

Customers can be added, deleted or edited within the Customer List. Customer data can be entered for a particular customer for use by the system, such as for routing or billing purposes. Customer markets can also be added, deleted or edited within the Customer Market List. Likewise, customer switches can be added, deleted or edited within the Customer Switch List.

As shown in FIG. 6, once a specific switch has been selected in the "Customer/Market/Switch Management" section 126 of the screen, the Code Owned Tab 130 displays the codes owned by that switch (or a Point of Interface (POI) of that switch) listed in a Codes Owned Window 138. Additionally, other information can be displayed, such as information utilized by the tandem manager and the latest LERG information for the selected code in the list. The tandem manager information relating to a specific code can be edited as appropriate. For example, a particular code can be designated as "Do Not Route" to indicate that the code is not routable, the designation of which will prevent a periodic LERG analysis performed by the system from identifying this as a new code that should be added to the system (in which case, it would be routed to the tandem manager tandem 44 contrary to its status as a non-routable code). A particular code may also be designated as "Ignore LERG" to indicate that the code is routable, the designation of which will prevent a periodic LERG analysis performed by the system from identifying this as a code that should be deleted.

Figure 7:
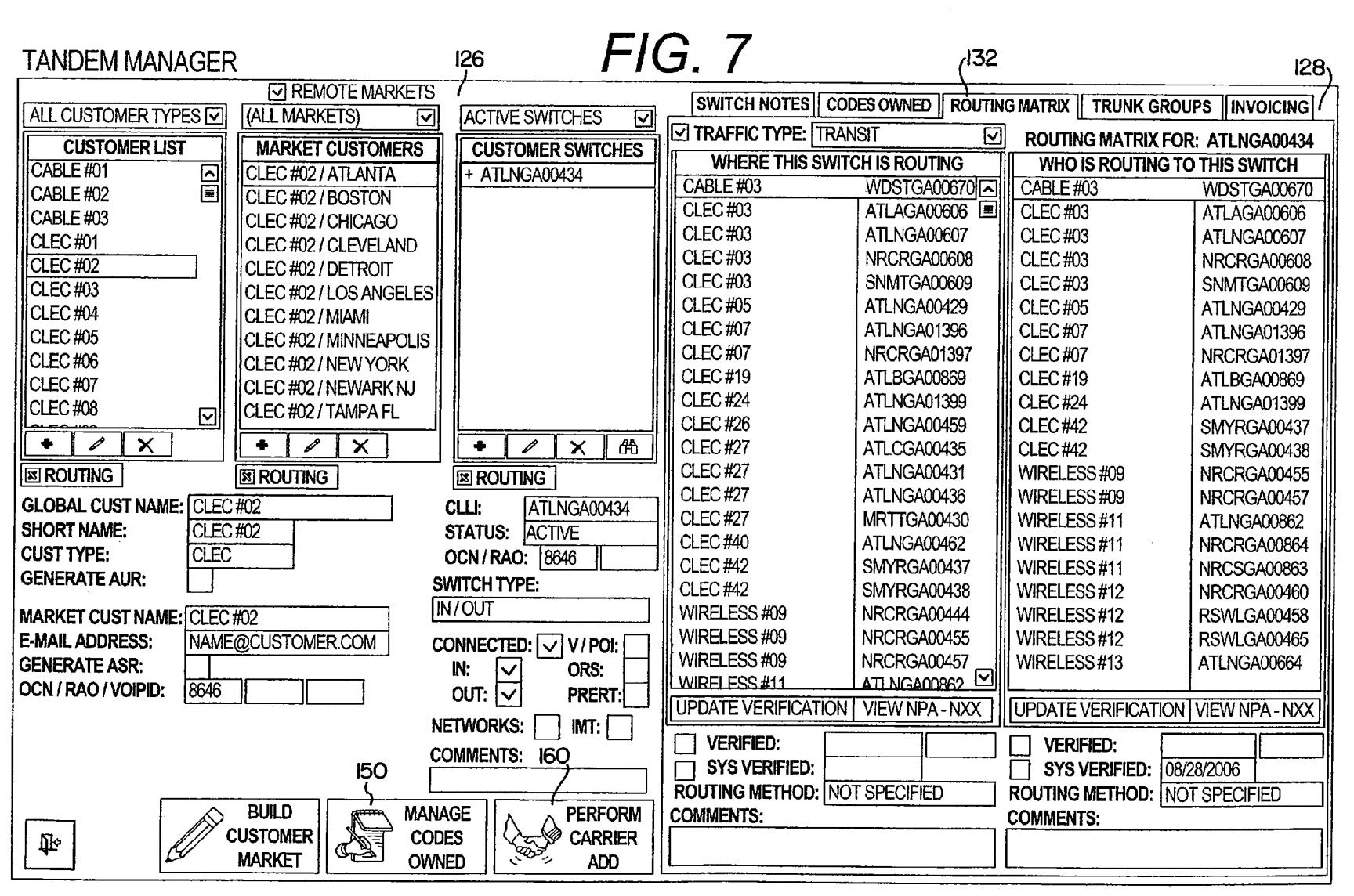

As shown in FIG. 7, the Routing Matrix Tab 132 will display the routing assignments to and from a particular switch (i.e., inbound and outbound) when the switch is selected in the "Customer/Market/Switch Management" section 126 of the screen and a "Traffic Type" is selected. In the preferred embodiment shown in FIG. 7, the outbound routing assignments are shown on the left side of the screen and the inbound routing assignments are shown on the right side of the screen. From this screen, traffic can be verified or the routing method can be updated for a particular switch. Inbound and outbound relationships can also be modified.

Referring back to the Main Customer Screen 120 shown in FIGS. 6 and 7, a Manage Codes Owned button 150 is provided to allow codes to be added to the tandem manager database. When codes are added, they are associated with a Metasolv order for either a T1/initial trunk group order or an initial translations order. To add codes to the tandem manager database or change routing information, the Manage Codes Owned button 150 is clicked to display the "Manage Codes" window, as shown in FIG. 8, where the associated Metasolv order number must be entered and validated by clicking on "Validate Order." After "Validate Order" is clicked, the "SWITCH INFO" data will populate the screen from the routing database, and "ORDER INFORMATION" data will populate the screen from Metasolv. Additionally, all codes for the particular switch (and any POIs for this switch) will be displayed as either "AVAILABLE" or "OWNED." To "own" any available codes (i.e., add them to the tandem manager database), the codes must be selected and then placed in the "Codes Owned" window of the screen (the right side shown in FIG. 6) by clicking an arrow 152. Codes can likewise be moved back by clicking an arrow 154. When the code is moved over to the "Codes Owned" window, the LERG data will be displayed as well as routing information/options. As shown in FIG. 6, an appropriate routing method can be selected for each code. Once all information is entered, the "Execute" button can be clicked, which will add the codes to the tandem manager database.

Referring again back to the Main Customer Screen 120 shown in FIGS. 6 and 7, a Perform Carrier Add button 160 is provided to allow initiation of routing between customers via a Carrier Add screen, as shown in FIG. 9. The Perform Carrier Add function will generate an e-mail to send to the customer that includes the routing information spreadsheet as well as an ASR, if required. It will also create a Carrier Add order in Metasolv and link the spreadsheet of codes to the Carrier Add order in Metasolv.

Referring to FIG. 9, to enter a Carrier Add order an associated Metasolv order number must be entered and validated by clicking on the "Validate Order" button. After the "Validate Order" button is clicked, the "ORIG SWITCH INFO" data will populate the screen from the routing database and the "ORDER INFORMATION" data will populate the screen from Metasolv. If a "Destination Market" is selected and the "Query Switches" button is clicked, all of the switches in the destination market will be retrieved with information about any routing assignments already made. Each potential switch has an indicator to indicate whether the "ORIG SWITCH" is routing to it as well as how many codes it should be routing to and how many are possible.

As shown in FIG. 9, from the "Available Switches" list, switches and codes can be selected for routing as appropriate. To initiate routing for available codes, the appropriate codes are selected and an add arrow 162 is clicked. Once all switches/codes have been selected for routing, an order is created. Under the "E-Mail Options" heading on the screen in FIG. 9, an ASR can be created for the particular customer by clicking "Enter ASR" and populating the ASR data as appropriate. The ASR data screens are shown in FIGS. 10 and 11.

After the ASR is filled out, an e-mail template can be selected to use and enter a Required Due Date. When the "Generate E-mail" button is clicked on the screen shown in FIG. 7, an e-mail application will be launched with an order to send to the client (attached as a spreadsheet and/or ASR). The order attachments are automatically linked to the Metasolv order previously specified. A sample ASR is shown in FIG. 12.

Figure 13:
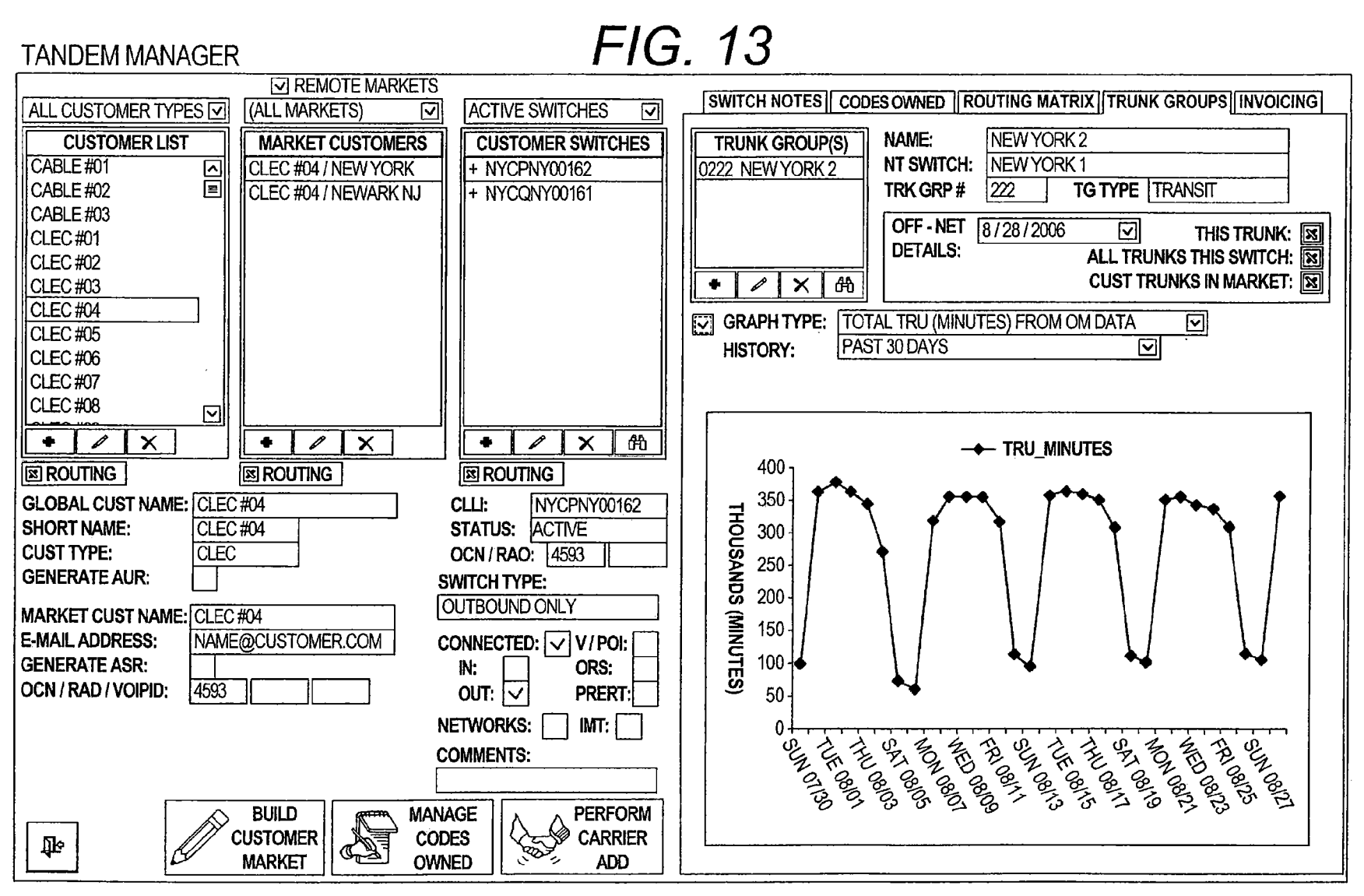

As shown in FIG. 13, the Trunk Groups Tab 134 provides access to trunk group data and related information associated with a particular switch.

The Invoice Tab 136 of the Main Customer Screen 120 allows access to all invoice-related functionality for a particular customer, including generating invoices and other reports, such as, for example, usage summaries. FIGS. 14-17 illustrate some of the GUIs for this functionality. FIGS. 18 and 19 illustrate some sample generated reports.

Control/Reference Data Module

The Control/Reference Data Module 106 provides for direct access and editing of customer and account data, markets and tandem manager switches, routing and LERG data and system configuration.

Management/Operating Reporting Module

The Management/Operating Reporting Module 108 provides for reporting functionality relating to customers, accounts, billing, invoicing, routing, management reporting and traffic reporting. For example, traffic analysis reports can be generated to evaluate traffic through a particular switch. Such analytical reports provide an invaluable tool for managing all types of information associated with tandem switching and usage. FIGS. 20 and 21 illustrate some sample reports generated under this functionality.

Custom Table View Module

The Custom Table View Module 110 provides for viewing of various tables associated with either the tandem manager database or the LERG database.

Other Function Module

The Other Function Module 112 provides for access to software-related functions, such as password management and control, user control, customization, settings, and the like.

Agreement/Compliance Verification

The tandem manager system optionally may include an Agreement/Compliance Database containing information relating to existing customer agreements, ILEC agreements, authorization and compliance documentation with respect to various governing bodies, government agencies, or other state and federal government regulatory concerns. Such information can be incorporated into the tandem manager system such that it can be accessed with respect to a particular customer to verify, for example, whether the customer has an existing agreement with the third-party tandem service provider, whether the third-party tandem service provider is authorized to operate in a particular state, and to verify whether the third-party tandem service provider has an existing interconnection and operation agreement with one or more LECs or ILECs in a particular state. Other information may include codes or other information relating to governing agencies or regulatory bodies. In a preferred embodiment, this database is automatically checked to verify such information as it relates to a particular customer when a customer is set up or edited within the system. The Agreement/Compliance Database can also be accessed to provide reports and other summaries in connection with compliance verification, such as, for example, compliance verification in connection with Sarbanes-Oxley-type inquiries.

While one or more specific embodiments have been illustrated and described in connection with the present invention, it is understood that the present invention should not be limited to any single embodiment, but rather construed in breadth and scope in accordance with recitation of the appended claims.

What is claimed is:

1. A tandem management system for use in connection with managing a plurality of subscriber-assigned telephone numbers amongst a plurality of telecommunications networks, the system comprising:
   a tandem manager computer within a first network of the plurality of telecommunications networks; and
   a tandem manager database in communication with the tandem manager computer, the tandem manager database having stored therein subscriber data comprising identification of one or more switches associated with the assigned telephone numbers amongst the plurality of telecommunications networks;
   wherein the tandem manager computer facilitates entry of the subscriber data; stores the subscriber data within the tandem manager database; creates a report for each participating network, the report comprising the subscriber data, wherein the subscriber data is customized for each network having specific requirements; and facilitates broadcasting of the reports for use amongst the plurality of telecommunications networks by delivering each of the reports to the appropriate participating networks for use in routing of telephone calls to at least one tandem switch based on the association of the at least one tandem switch with at least one of the assigned telephone numbers associated with each of the telephone calls, the association derived from the subscriber data.

2. The system of claim 1, the subscriber data comprising a Number Plan Area—Central Office (NPA-NXX) code.

3. A method for managing a plurality of subscriber-assigned telephone numbers amongst a plurality of carrier networks, the method comprising the steps of:
   obtaining, by a tandem manager computer, subscriber data associated with one or more switches each owned by one of a plurality of carriers associated with one or more of the plurality of carrier networks;
   updating a tandem manager database associated with the tandem manager computer with the subscriber data;
   creating a report, by the tandem manager computer, for each of the plurality of carriers, the report comprising the subscriber data, wherein the report for each of the plurality of carriers that have carrier-specific requirements is customized accordingly; and
   broadcasting the reports, by the tandem manager computer, to the plurality of carriers by sending the respective reports to each of the plurality of carriers so that each carrier can direct telephone calls to at least one tandem switch based on the association of the at least one tandem switch with at least one of the assigned telephone numbers associated with each of the telephone calls, the association derived from the subscriber data.

4. The method of claim 3, wherein the subscriber data comprises an NPA-NXX code.

5. The method of claim 3, further comprising the step of reporting call traffic associated with the plurality of carriers that is switched by the at least one tandem switch.

6. The method of claim 5, further comprising the step of billing each of the plurality of carriers based on its respective directed telephone calls.

* * * * *